Jan. 22, 1924.

J. FIEUX 1,481,593

CLUTCH

Filed Sept. 3, 1921

Inventor
Jean Fieux
By P. Singer
Atty

Jan. 22, 1924.  
J. FIEUX  
CLUTCH  
Filed Sept. 3, 1921  
1,481,593  
3 Sheets-Sheet 2

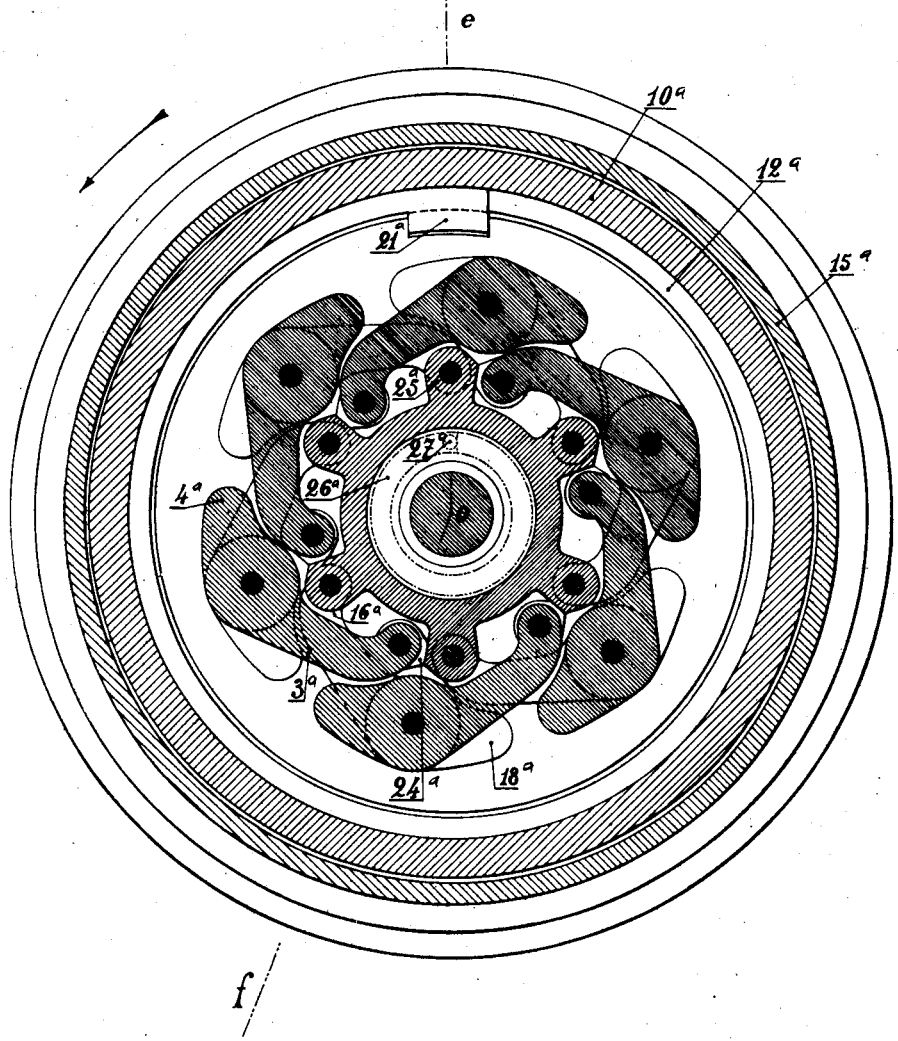

Patented Jan. 22, 1924.

1,481,593

UNITED STATES PATENT OFFICE.

JEAN FIEUX, OF PARIS, FRANCE.

CLUTCH.

Application filed September 3, 1921. Serial No. 498,452.

*To all whom it may concern:*

Be it known that I, JEAN FIEUX, a citizen of the French Republic, and resident of Paris, in the Republic of France, have invented certain new and useful Improvements in or Relating to Clutches, of which the following is a specification.

The present invention has for its object the provision of an improved friction coupling clutch capable of ensuring the automatic coupling of a motor shaft and a driven shaft and of limiting the effort transmitted with great precision.

In practice the operation of the clutch is independent of the value of the coefficient of friction; the value of the maximum couple which can be transmitted depends only on the speed of the motor shaft. It is automatically moved into complete coupling position as soon as the resistance of the driven shaft allows of this action and during slipping as soon as the resistance becomes excessive. Finally uncoupling or complete disengagement of the two shafts, that is to say, the driving shaft and the driven shaft, can be effected when the speed of the motor shaft falls below a certain limit.

This invention is characterized by the combined action of centrifugal force and the driving effort of the motor so as to ensure the driving of a clutch of the helical coil type, the effect of the motor couple on this drive being always opposed to the effect of centrifugal action so that the resultant force which is applied to the free end of the helical coil in order to create the friction necessary for coupling retains a suitable value during the entire period of slipping.

Diagrammatical and constructional forms of the invention are shown by way of example in the accompanying drawings.

Figure 5 is a cross section on the line $c\ d$, Figure 4, the coil being shown in elevation.

Figure 1:
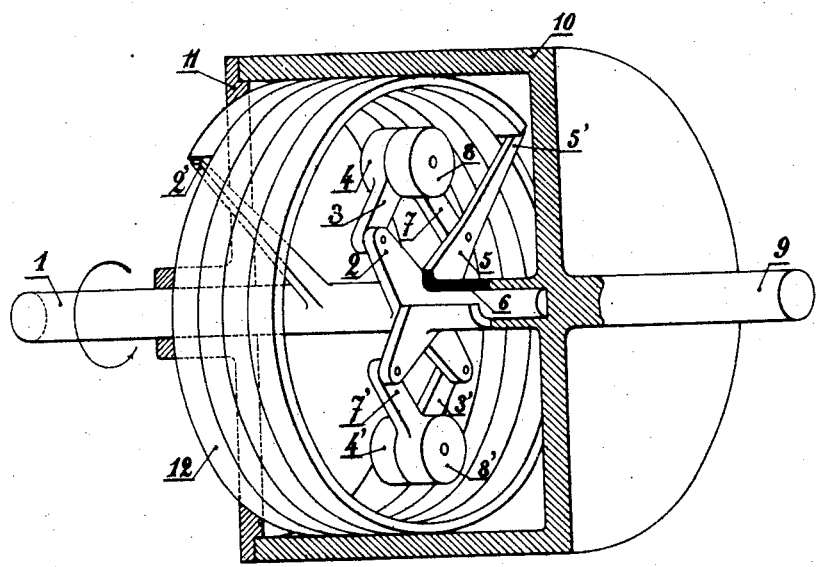
Figure 1 is a diagrammatic perspective view of the invention certain parts being shown in section along axial planes.

In the diagrammatic arrangement shown in Figure 1 the motor shaft 1 is integral with or rigidly connected to a disc 2 or radial arms on which rods are articulated at suitable distances apart and diametrically opposite each other, the pivotal supports of the said rods being arranged parallel to the axis of the motor shaft and being provided with heavy or massive heads 4 and 4'. A second disc 5 integral with or rigidly connected to a hub 6 is arranged to oscillate freely on an extension of the motor shaft. Rods 7 and 7' terminating in heavy or massive heads 8 and 8' are articulated on the disc 5, the axes of the pivotal supports of the said rods being disposed parallel to the motor shaft axis. The heads of the rods 3 and 7 are articulated on a pivotal support common to both the heads of both rods and the heads of the rods 3' and 7' are likewise articulated on a pivotal support common to both rods 3' and 7'.

The deformable arrangement of the groups of masses and the rods which carry them is such that said devices can turn in the direction of the arrow; the motor shaft 1 turns in advance of the disc 5, when the two groups of masses 4, 8 and 4', 8' spread apart centrifugally, that is one group relatively to the other and inversely.

The driven shaft 9 disposed on an extension of the motor shaft is integral with or rigidly connected to a drum 10 closed by a disc 11 loosely mounted on the motor shaft. Inside the drum is arranged a frictional member formed by a helical spring 12 the two ends of which are subjected to the reactions of the pins 2' and 5' respectively integral with or rigidly connected to the discs 2 and 5, the helical angle of the coil being such that a certain displacement of the motor shaft 1 and of the disc 5 corresponding to a displacement outwardly of the two groups of masses 4, 8 and 4', 8' may have the effect of increasing the diameter of the coil so that the outer surface of the coil becomes applied to the interior surface of the drum.

The action of the construction and arrangement as above described is as follows.

When coupling is incomplete the motor shaft entrains with it all the members or parts in the interior of the drum in the direction of the arrow and a rotational speed greater than that of the driven shaft. Centrifugal force which acts on the masses 4, 4′ and 8, 8′ produces reacting forces which result through the intermediary of the pins 2′ and 5′ for pressing the ends of the helical coil toward each other and thereby diametrically expanding the coil, thus causing a certain friction which constitutes the driving couple actuating the driven shaft. It should be observed in this case that one end of the helical coil is in contact with the pin 2′ integral with or rigidly connected to the motor shaft and that the other end of the helical coil is in contact with the pin 5′ integral with or rigidly secured to the oscillating disc 5.

The driving effort of the motor has, on the contrary, the effect of tending to force the masses towards the centre and consequently of opposing the action of centrifugal force. This dual action leads to increased efficiency of the friction under conditions fully determined by the motor. During the period of slipping the reaction of the pin 2′ on one end of the helical coil increased by the entraining force due to the friction acts to balance the reaction of the pin 5′ on the other end of the helical coil, this latter reaction being due solely to centrifugal force.

If the helical coil is given a sufficient number of convolutions the reaction of the pin 2′ may become very slight relatively to the reaction of the pin 5′ no matter what the coefficient of the frictional surfaces may be. The variations can therefore have a very great effect on the value of the maximum couple transmitted by the friction because the effect of centrifugal force is itself constant and quite definite for a given speed of the motor shaft. From this is derived the great precision above referred to in the limitation of this couple.

When the resisting couple becomes insufficient to ensure a state of equilibruim corresponding to the slipping condition, the clutch action becomes complete. The centrifugal effect does not diminish as the motor couple, the reaction of the pin 2′ increases and immediately effects by excess frictional action the complete coupling of the helical coil and the drum.

The apparatus being now in complete coupling action an increasing value of the resisting couple has for its effect to cause an increase in the value of the motor couple and consequently to reduce the reaction of the pin 2′ on the free end of the helical coil. When this reaction has been sufficiently reduced slipping again takes place.

It should be observed that in this arrangement the reaction of the pins 2′ and 5′ are effected directly on the ends of a frictional member which has not, as in the usual cone clutch, any natural tendency to engagement nor, as in clutches of the disc type, the inconvenience of being difficult in its control under load by the friction of the discs on their driving keys or slots. The automatic control of this friction system adopted for the realization of the present invention is effected therefore under the best possible conditions.

On the other hand this frictional system has the advantage of effecting the friction on cylindrical surfaces which are applied in such manner as to effect complete and perfect contact between the frictional surfaces by reason of the flexibilty of the helical coil, the said surfaces being capable of being lubricated in a regular and abundant manner. The apparatus can always be constructed of such dimensions that the coefficient of wear and tear on the helical coil under the greatest load does not exceed the coefficient required for an ordinary transmission bearing. The wear and tear is therefore very slight; by reason of the deformability of the system carrying the centrifugal masses, the apparatus automatically recovers itself.

Figure 3:
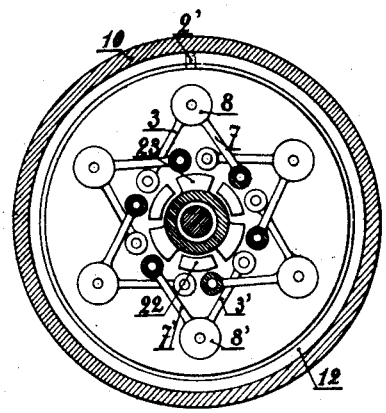
Figure 3 is a cross section on the line $a$—$b$, Figure 2, the coil being shown in elevation.
Figure 2:
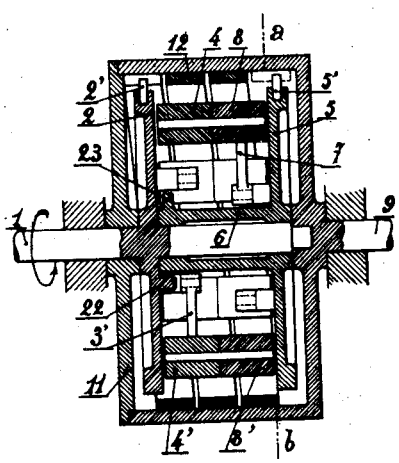
Figure 2 is an axial section of a constructional form in accordance with the present invention which construction approaches as near as possible the diagrammatic form shown in Figure 1.

In the constructional form shown in Figures 2 and 3, the essential parts forming the diagrammatical apparatus hereinbefore described are provided with the same reference numerals. On each of the discs 2 and 5 are articulated a suitable number of rods having massive twin heads as hereinbefore explained. In general the number of heads may be sufficient so that the space comprised between the two discs can be fully utilized. The disc 2 and the hub of the disc 5 are provided with projections 22 and 23 which limit the relative angular displacement in such manner that the disc 2 entrains the disc 5 directly when the motor shaft is at first or initially set in rotation. At this moment the centrifugal force has only a very small value.

In this arrangement the helical coil may be mounted between the pins 2′ and 5′ with a certain initial tension opposed to the action of centrifugal force so as to have only a useful driving effect which comes into operation at a certain speed of the motor shaft.

Figure 4:
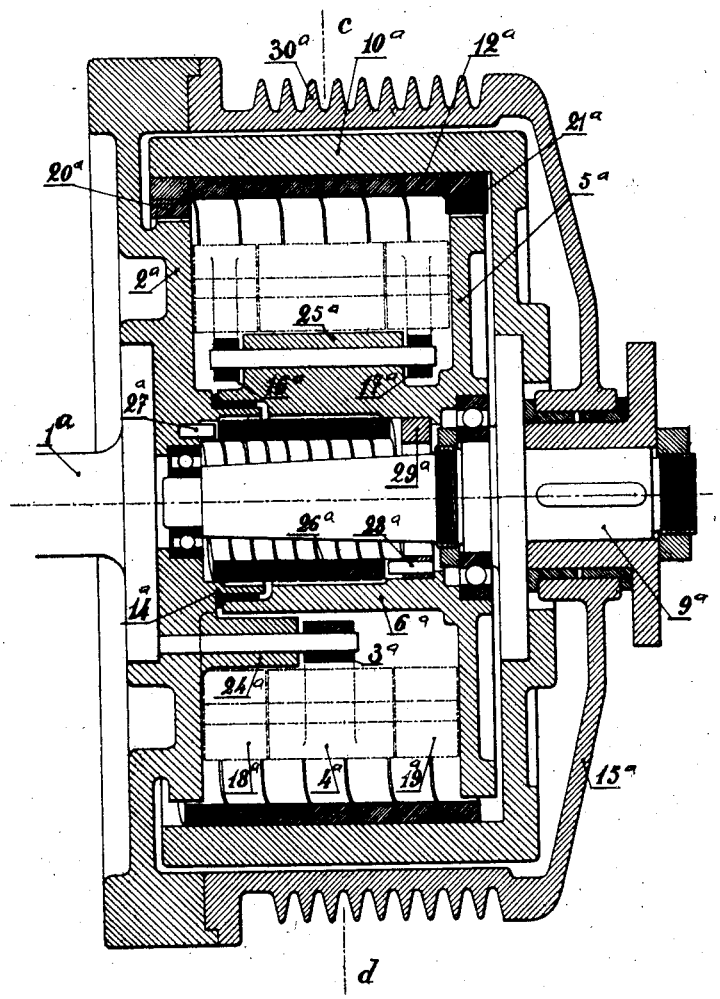
Figure 4 is an axial section on the line $e\ o\ f$, Figure 5 of a constructional form of the invention as adapted to the fly wheel of a motor.

In the constructional form shown in Figures 4 and 5 the motor shaft 1ª is integral with or rigidly connected to the disc 2ª forming the main part of the fly wheel of the motor and carrying the axes of articulation of six rods 3ª each terminating in a massive head 4ª of a form which will fully utilize the intervening space. A second disc 5ª integral with or rigidly connected to a hub 6ª is adapted to oscillate freely on a trunnion 14ª on the disc 2ª and on the driven shaft 9ª which is centered by means of a ball bearing in the bore of the disc 2ª, the opposite end of the said driven shaft being supported by a cover piece 15ª integral with or rigidly connected to the said disc.

The hub of the disc 5ª carries the axes of articulation of six rods 16ª and six rods 17ª each of which are terminated by massive heads 18ª and 19ª.

The rods 3ª, 16ª and 17ª are articulated together in a manner so as to form a deformable system adapted to turn in the direction indicated by the arrow, the motor shaft rotating in advance of the disc 5ª when the centrifugal group 4ª, 18ª and 19ª spreads apart from the axis of rotation and inversely.

The driven shaft 9ª is rigid with an open drum 10ª containing a helical coil 12ª each end of which carries a pin. The pin 20ª on the fixed end engages in a slot of suitable form provided on the disc 2ª. The pin 21ª at the fixed end engages in a slot formed in the disc 5ª. The direction of the angle of the helical coil is such that a certain displacement of the two discs corresponding to a displacement towards the exterior of the centrifugal groups of masses has for its effect to increase the diameter of the helical coil and to cause the exterior surfaces of the helical coil to apply themselves to the interior surfaces of the drum.

As in the preceding arrangement, the relative angular displacements of the discs 2ª and 5ª are limited by stops at the moment of starting. These stops are formed by bosses 24ª and 25ª which carry the axes of articulation of rods 3ª and 16ª.

In the interior of the hub and projecting from the disc 5ª is a spring 26ª which operates on tension and the ends of which exert their action, one on the disc 2 by means of the pin 27ª, the other end exerting its action on the disc 5ª by means of a pin 28 and an adjusting washer 29ª which is fitted and in practice may be also threaded in an annular recess in the hub. The tension of this spring always acts in opposition to the action of centrifugal force and can be regulated by suitable adjustment of the washer 29ª on the disc 5ª. It has for its object to oppose the formation of a driving couple for all speeds of the motor below a given speed.

The cover 15ª is provided with ribs 30ª so as to dissipate rapidly the heat generated when the device is in use.

Having now particularly described and ascertained the nature of my said invention and in what manner the same is to be performed, I declare that what I claim is:

In a clutch, the combination of a driving shaft, a driven shaft, a drum fast to the driven shaft, a coiled friction spring arranged in the drum, a stop on the driving shaft engaging one end of said spring, an element loose on the driving shaft and having a stop engaging the other end of the spring, a centrifugally movable weight and arms pivotally connecting said weight to the driving shaft and to the last named stop.

In witness whereof I affixed my signature.

JEAN FIEUX.